United States Patent [19]
Laing

[11] 3,838,947
[45] Oct. 1, 1974

[54] ROTATING ELECTRICAL MACHINE WITH EVAPORATION COOLING

[76] Inventor: Nikolaus Laing, 7141 Aldingen bei, Stuttgart, Germany

[22] Filed: Dec. 20, 1972

[21] Appl. No.: 316,979

Related U.S. Application Data

[63] Continuation-in-part of Ser. No. 93,531, Nov. 30, 1970, Pat. No. 3,710,156.

[52] U.S. Cl. .................................. 417/367, 310/54
[51] Int. Cl. ............................................. F04b 39/06
[58] Field of Search ............ 310/52, 54, 55, 57, 86, 310/87, 104, 166; 417/420, 367

[56] References Cited
UNITED STATES PATENTS 2,634,375  4/1953  Guimbal .............................. 310/54
2,683,823  7/1954  Cunningham ........................ 310/52
3,294,991  12/1966  Ward .................................... 310/54
3,354,833  11/1967  Laing ................................. 417/420
3,490,379  1/1970  Laing ................................. 317/420
3,649,137  3/1972  Laing ................................. 417/420

Primary Examiner—R. Skudy
Attorney, Agent, or Firm—Pennie & Edmonds

[57] ABSTRACT

An electric rotatable machine having a stator, a rotor, and a first pole ring for producing a rotating magnetic field all hermetically sealed in a housing and a second pole ring outside of said housing adapted to be rotated by the rotating magnetic field where said housing has therein a condensate of a material the boiling point of which is below the highest permissable operating temperature of the components within the housing.

7 Claims, 1 Drawing Figure

3,838,947

ROTATING ELECTRICAL MACHINE WITH EVAPORATION COOLING

CROSS REFERENCE TO OTHER APPLICATIONS

This application is a continuation-in-part of my co-pending application Ser. No. 93,531 filed Nov. 30, 1970, now a U.S. Pat. No. 3,710,156.

THE PRIOR ART

In conventional split-tube electric motor operated pumps where the stator is hermetically sealed from the material being pumped, a split-tube is normally brought into good heat conductive contact with the stator to cool the same. The stator winding in such pumps, however, is only in indirect heat conductive communication with the laminations with electrical and thermal insulating slot linings being interposed. No direct heat conductive communication with the split-tube exists as regards the regions of maximum heat development, namely the end windings. Consequently the permissible specific loading of such motors is very low and the material requirements correspondingly high. By contrast with motors having outwardly extending shafts, motors having rotors disposed in a liquid medium being conveyed cannot be provided with additional air cooling by means of a fan, unless a second armature is introduced into the same stator field, which would entail the provision of considerable mechanical equipment. The considerable overdimensioning of the stator required in view of the unfavorable cooling conditions is, in accordance with the invention, avoided by means of cooling by evaporation of a liquid.

Rotating electric machines in which condensate of a liquid is conducted to the stator are known in the refrigerator art. Condensate is conducted over the windings of an electric motor where it evaporates and the resulting gas phase is then conveyed to a compressor which compresses the gas. Thereafter the gas condenses in an air- or water-cooled condenser in order to be returned to the motor.

OBJECT OF THE INVENTION

An object of the invention is to provide cooling of stators of rotating electric machines having a definite heat sink, and particularly for pump motors which form part of split-tube pump units. The heat from the stators of such motors is transferred through a magnetically permeable wall, e.g. a split-tube or a spherical separating membrane, to the medium being conveyed.

DESCRIPTION OF THE INVENTION

The invention also makes use of a liquid or condensate which, at the internal pressure chosen, has a boiling point below the operating temperature of the winding. The liquid in accordance with the invention however does not require a separate compressor as with the known refrigerator art. The stator of the rotating machine in accordance with the invention is enclosed and hermetically sealed by a casing, the interior of which is filled with a saturated vapor of and a small quantity of a condensate of a volatile liquid, e.g. a fluorine hydrocarbon or a silicon compound. In operation the vapor condenses on a separating wall which is in heat-conductive communication with the medium being conveyed, and is then conducted into the motor winding where it evaporates. As compared with conventional cooling methods, this method enables approximately twenty fold heat flows to be achieved for a temperature difference of only a few degrees C between the winding temperature and a heat sink, i.e. a separating wall which is in heat conductive contact with the medium being conveyed. In this manner cooling of the winding is adequate even where the heat sink assumes a high temperature, as for example in the case of circulating pumps for heating systems. The condensate is conveyed to the parts to be cooled either by capillary action in the laminations or preferably by capillary action in a special slot lining or pole envelope. The condensate may also be conveyed by means of special absorbant strips or wicks one end of which touches the separating wall acting as a condenser, or one end of the strips or wicks may extend into a condensate sump which collects the condensate formed on the separating wall.

The inventive principle is not limited to semi-wet induction motors which are separated from the armature by a separating wall disposed in the magnet gap, but may also be applied to hermetically sealed motors which drive a magnetic coupling. In this arrangement a driving half coupling drives a second driven half coupling which is disposed outside the hermetically sealed space formed in part by a magnetically permeable separating wall. In this application a material, for example Frigen 113 is selected for the saturated vapor and the condensate in order not to dissolve the oil lubricant of the motor bearing. Finally, the condensate itself may also serve as the lubricant, particularly where part of the bearing is in heat conductive contact with a heat sink.

Broadly the invention comprises having a stator of a rotatable electric machine, the rotor of the machine and a first rotatable pole ring driven by the rotor all hermetically sealed in a casing and having a separate rotatable pole ring exterior of the casing which is rotated by the magnetic field produced by the first rotatable pole ring. A magnetically permeable separating wall is positioned between the first and second pole rings and forms part of the casing. A condensate having a boiling point less than the operating temperature of the stator is included within the housing with a vapor of the condensate filling the interior of the housing. The separating wall is in thermal contact with a region having a lower temperature than the operating temperature of the stator such that the separating wall acts as a condenser for the vapor. Means are provided for conveying condensate from the separating wall to the stator where the condensate changes to vapor absorbing heat in the process and giving up heat to the region of lower temperature when the vapor condenses on the wall.

DESCRIPTION OF THE PREFERRED EMBODIMENT

Figure 1:
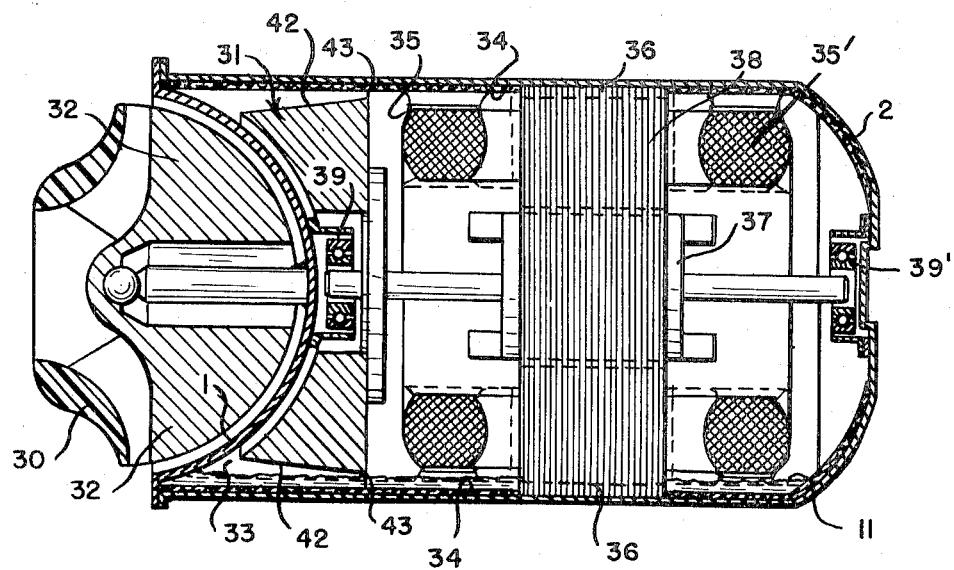
FIG. 1 illustrates in section a rotatable electric machine according to the invention.

FIG. 1 illustrates a rotatable electric machine according to the invention used as a split-tube type pump. As shown, the pump impeller 30 is adapted to be contained within a conduit or tube containing the fluid to be pumped. The impeller is driven by a concave rotatable magnetic pole ring 31 which when rotated creates a magnetic field which will drive a second rotatable magnetic pole ring 32 attached to the impeller. Both pole rings 31 and 32 comprise soft or permanent magnetic material. The pole ring 31 is connected by means of a shaft to an armature or rotor 37 which rotates relative to a stator comprising insulated coils or windings 35 and pole ring 38. The stator and rotor which together comprise an electric motor and the pole ring 31 are all hermetically contained within a housing comprising casing 2 and magnetically permeable separating wall 1. As shown the separating wall 1 is positioned between the pole rings 31 and 32, and being of a magnetically permeable material, allows the magnetic forces from the rotating pole ring 31 to act on the ring 32 to rotate the same.

A condensate 11 of material having a boiling point less than the maximum operating temperature of the parts making up the electric motor, and particularly the windings 35, is included in the housing. The rotation of the pole ring 31 causes the condensate to be thrown outwardly into the annular region 33 and thence to an absorbant cylinder 34 comprising textile fibers. The absorbant cylinder 34 acts as a condensate transfer means to transfer condensate from the region adjacent the wall 1 to regions adjacent the windings 35 by means of capillary action of the fibers. The heat of the winding when the machine is operating causes the condensate to evaporate so that heat is withdrawn from the windings 35 and thus from the entire stator.

Flattened or recess portions 36 are provided in the pole ring 38 to accommodate the absorbant material of the cylinder 34 and to allow condensate to be conveyed to the end windings 35' whereby these windings will also be cooled. The concave pole ring 31 has a conical surface area 42 whereby condensate may run along the surface to the outer-most edge 43 where it is thrown off by centrifugal force and sprayed against the end windings 35. When the machine is not operating, the condensate 11 will condense at the lowest point.

The separating wall 1 adjoins and is in thermal contact contact with a region of lower temperature than the operating temperature of the stator such that the surface of the wall facing the interior of the housing will act as a condenser to condense the vapor thereon. In the embodiment shown, the region of lower temperature would be the portion of the split-tube containing the impeller 30, pole ring 32 and fluid being pumped with the heat from the separating wall being transferred to the fluid.

Preferably where the bearings are contained within the housing as shown in the drawing, the condensate comprises a material which will not dissolve the lubricant of the bearings 39 and 39'. Where the lubricant is oil, the condensate may be Frigen 113. Also the condensate may comprise a material which acts as a lubricant for the bearings.

It is seen that when the motor of the drawing is operating, the condensate adjacent windings 35 and 35' will be vaporized withdrawing heat from the windings in the process. This condensate being in vapor form will then contact the separating wall 1 which is in good thermal contact with the fluid being pumped by the impeller 30. The relatively cool wall will condense the vapor and transfer heat in the process to the fluid being pumped. Some of the condensate will drop directly from the separating wall to the lower portion of the housing and some will drop onto the rotating pole ring 31 where it will be flung off edge 43 to contact the absorbant material of the cylinder 34 and the windings 35. The absorbant material 34 will then serve to carry the condensate to the end windings 35 and 35' whereby the cycle will be repeated.

Preferred specific condensate materials which act as lubricants for bearings according to the invention are methyl-alcohol, ethyl alcohol, freon 11 and similar derivates of fluor hydrocarbons.

I claim:

1. A rotatable electric machine comprising a stator having a coil, a rotor, a first pole ring driven by said rotor, a housing enclosing and hermetically sealing said stator, rotor and first pole ring, a second rotatable pole ring exterior of said housing and adapted to be rotatably driven by said first pole ring, a magnetically permeable separating wall forming part of said housing positioned between said first and second pole rings, a condensate of a material in said housing having a boiling point at the pressure within the housing less than the highest operating temperature of said coil and above the operating temperature of said separating wall with a vapor of said condensate filling the interior of said housing, and condensate transfer means for bringing said condensate into thermal contact with portions of said coil whereby when said machine is operating and said coil becomes heated condensate contacting said coil vaporizes with the vapor then condensing on a wall of said housing whereby heat is transferred from said coil to said wall.

2. A rotatable electric machine according to claim 1 having in addition bearing means within said housing for rotatably supporting said rotor and said first pole ring and wherein said condensate is a lubricant for said bearing means.

3. A rotatable electric machine according to claim 1 wherein said separating wall is in thermal contact with a region of lower temperature than the operating temperature of said coil whereby said separating wall will act as a condenser for said vapor.

4. A rotatable electric machine according to claim 3 wherein said condensate transfer means comprises an absorbant body extending from a region adjacent said separating wall to a region adjacent said coil whereby said condensate is moved by capillary action from said separating wall into thermal contact with said stator.

5. A rotatable electric machine comprising a stator, rotor means, a hermetically sealed housing enclosing said stator and said rotor means, a pole ring exterior of said housing and adapted for rotation, a magnetically pervious wall forming a part of said housing separating said pole ring from the interior of said housing, said rotor means including means which upon rotation creates a field and magnetic couple for driving said pole ring, a condensate of an electrically nonconductive fluid material in said housing and where a vapor of said fluid material may substantially fill the interior of said housing, a wall region of said housing adapted to act as a condenser means for said vapor, and a condensate transfer means for conveying said condensate from said wall region to said stator, said fluid material having a boiling point at the pressure existing within said housing below the highest permissible operating temperature to which said stator may be subjected and which is above the temperature of said wall region whereby when said machine is operating and said stator becomes heated, condensate conveyed to said stator by said condensate transfer means will be vaporized with the vapor then condensing on said wall region whereby heat from said stator is conveyed to said wall region.

6. A rotatable electric machine acording to claim 5 wherein said wall region comprises said separating wall and is in thermal contact with a region of lower temperature than the operating temperature of said stator whereby said separating wall will act as a condenser for said vapor.

7. A rotatable electric machine according to claim 6 wherein said condensate transfer means comprises an absorbant body extending from an area adjacent said separating wall to an area adjacent said stator whereby said condensate is moved by capillary action from said separating wall into thermal contact with said stator.

* * * * *